Oct. 3, 1961        A. T. DUBE        3,002,484
BOAT

Filed April 24, 1958        4 Sheets-Sheet 1

INVENTOR.
ALFRED T. DUBE

Oct. 3, 1961  A. T. DUBE  3,002,484
BOAT
Filed April 24, 1958  4 Sheets-Sheet 2

INVENTOR.
ALFRED T. DUBE

INVENTOR.
ALFRED T. DUBE

Oct. 3, 1961 A. T. DUBE 3,002,484
BOAT
Filed April 24, 1958 4 Sheets-Sheet 4

INVENTOR.
ALFRED T. DUBE

United States Patent Office 3,002,484
Patented Oct. 3, 1961

3,002,484
BOAT
Alfred T. Dube, Plank Road, R.F.D. 1, Waterbury, Conn.
Filed Apr. 24, 1958, Ser. No. 730,606
1 Claim. (Cl. 114—61)

My invention relates to boats, and particularly to boats of medium and small size, for use in open, relatively rough water.

Medium and small size boats are subject to two primary disadvantages when used in open water or wherever relatively great distances are involved. First, regardless of the type of engine or motor used, there is always a possibility of its becoming inoperative, leaving the craft at the mercy of the wind and waves, and with no effective way to either propel the boat or to guide its movement. Secondly, such boats do not afford a high degree of security or safety. If the hull of such a boat is punctured or damaged, such as by a collision with a submerged or floating object, or by other means, it is in serious danger of sinking unless such damage can be repaired at once. In addition, such boats are greatly affected by the action of waves, even when the propulsion system is functioning properly, and there is an ever-present danger of capsizing in heavy seas.

It is a general object of the invention to provide a boat of medium or small size which affords a maximum degree of safety to the user.

It is another object of the invention to provide a boat of medium or small size which will ride smoothly and with a high degree of stability, even in rough water.

It is another object of the invention to provide a boat which will be able to propel itself and to afford means of controlling its direction of movement even when its motor or engine is disabled.

Another object of the invention is to provide a boat which is practically impossible to capsize and which will not sink even in high seas breaking over its decks or even if capsized.

It is a further object of the invention to provide a boat having a non-fuel-consuming auxiliary propulsion system which will automatically come into operation whenever the projulsion force supplied by its conventional motor or engine decreases a predetermined amount.

It is another object of the invention to provide a boat having the speed characteristics of boats with a planing hull and the stability characteristics of boats with a deep-draft hull.

It is another object of the invention in one form to provide a boat having a large deck area and a high degree of stability without requiring large draft.

In accordance with the invention, a boat is provided including a basic boat unit and a pair of elongated outboard pontoons on either side thereof and pivotally connected thereto and means for positively controlling the positioning of the pontoons with respect to the basic boat unit.

In accordance with another aspect of the invention, the means connecting the pontoons to the boat unit includes motion-dampening and shock-absorbing means.

In accordance with another aspect of the invention, the means connecting the pontoons to the boat unit includes power-generating means, and means for selectively utilizing such power to supplement power developed by the boat's conventional engine or motor.

In accordance with a further aspect of the invention, the deck of the main boat unit is extended on either side over the space between the main boat unit and the pontoons so that a craft is provided having large deck area and small draft, with high stability.

Additional objects and advantages of the invention will in part be pointed out and in part become obvious from the following description. The particular aspects considered to be novel will be specifically pointed out in the appended claims. The invention itself, however, will be clearly understood from the following detailed description, taken in conjunction with the accompanying drawings, in which:

Referring first to FIGURES 1-9, the invention is shown as embodied in a boat comprising a basic boat unit 10 and a pair of elongated outboard pontoons 11 and 12, each connected thereto by two pairs of arms 13 and 14, respectively, having bracing struts 13a and 14a extending therebetween.

Figure 5:
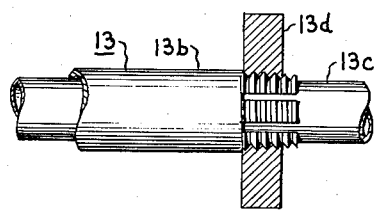
FIGURE 5 is a fragmentary view of a connecting arm portion.

Each of the arms 13 and 14 includes two telescopically engaged sections such as 13b and 13c, FIGURE 5, the outer section 13b having its end portion cut longitudinally into three portions and provided with a tapered thread and a clamping nut 13d. The effective length of the arms 13 and 14 and consequently the distance of the pontoons 11 and 12 from the boat unit 10 may therefore be adjusted as desired within predetermined limits by loosening the nut 13d, sliding the portion 13c within the portion 13b, and tightening the nut 13d.

The pontoons 11 and 12 comprise elongated hollow, water-tight bodies, each divided into a plurality of water-tight sections by suitable transversely-extending bulkheads, and are provided with recesses 19 and 20. The outer ends of the arms 13 and 14 extend into the recesses 19 and 20 respectively, and are pivotally connected to the pontoons at 15 and 16. Thus the pivotal anchor points of the arms 13 and 14 are positioned below the center of gravity of the pontons 11 and 12, improving their stability in transmitting force to the arms 13 and 14 in a manner to be described. Intermediate their ends the arms 13, 14 are pivotally secured to the main boat unit 10 by the pivotable brackets 17, 18.

The pontoons 11 and 12 are preferably of greater length than the boat unit 10, so as to project slightly beyond the prow and also slightly behind the stern of the boat unit 10. The pontoons thus serve to break the force of waves at the front and rear of the boat. Moreover, the pontoons serve to protect the hull of the main boat unit from damage by collision with other objects in the water. In wartime applications such as by the armed forces, such pontoons, suitably dimensioned as to depth with respect to the depth of the hull of the main boat unit, are also adapted to serve to shield the main hull from impact by underwater projectiles.

The inner ends of the arms 13 are pivotally connected at 21 to connecting rods 22 and 23 arranged to operate a forward pump cylinder 24 and a rear pump cylinder 25, respectively, at one side of the main boat unit. The inner ends of the arms 14 are similarly pivotally connected at 26 to connecting rods 27 and 28 arranged to operate a forward pump cylinder 29 and a rear pump cylinder 30, respectively, at the other side of the main boat unit. The pump cylinders 24, 25, 29, and 30 are each pivotally supported within the hull of the boat unit 10 by brackets 31, see FIGURE 8.

Figure 3:
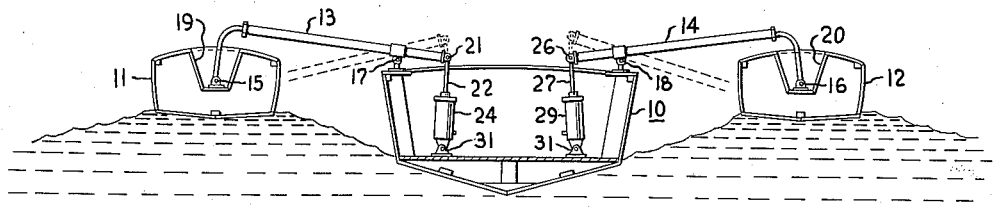
FIGURE 3 is a sectional view of the boat of FIGURE 1 showing the parts in a first condition.
Figure 4:
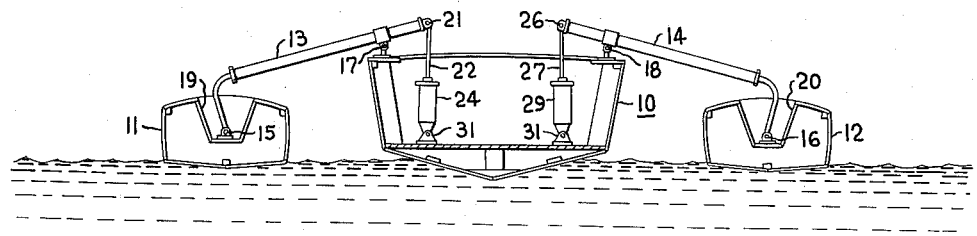
FIGURE 4 is a sectional view similar to FIGURE 3 but showing the parts in a second condition.

Referring particularly to FIGURES 3 and 4, the operation of the pontoons 11 and 12 and of the pumps 24, 25, 29, and 30 is such that when the pontoons are raised with respect to the boat unit 10, as indicated by the solid line position of the connecting arms 13 and 14 in FIGURE 3, the connecting rods 22, 23, 27, and 28 are forced inwardly of the respective pumps; and when the pontoons are lowered with respect to the boat unit 10, as indicated by the dotted line position of the connecting arms in FIGURE 3, the connecting rods are drawn outwardly of the pumps. Such alternate raising and lowering of the pontoons with respect to the boat unit is caused by the action of the waves or swells, except as hereinafter described.

Figure 6:
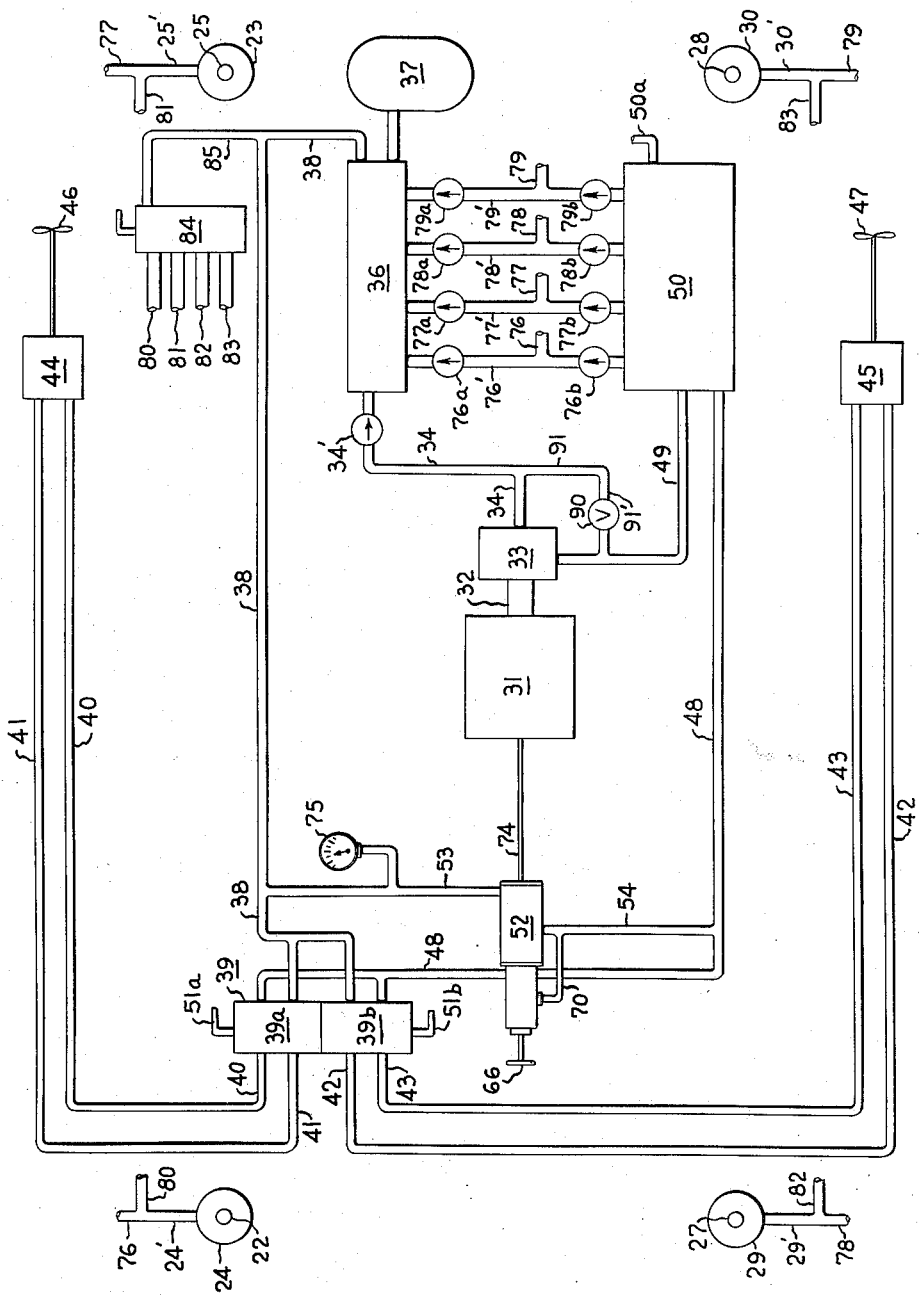
FIGURE 6 is a schematic diagram of the main and auxiliary power systems and their controls.

Referring to FIGURE 6, the power system and controls therefor include a fuel-consuming motor 31 such as a diesel or gasoline engine, mounted in a suitable location such as a little to the rear of center of the boat unit 10. It is an advantage of the present invention, however, that the location of the engine or motor 31 is not restricted by the necessity of maintaining a particular position thereof relative to the propelling means, e.g., the propellers. The engine 31 is coupled by connecting shaft 32 to drive a main hydraulic fluid pump 33. The outlet 34 of the pump 33 is connected through a one-way valve 34' to a chamber 36 having an air-head chamber 37 connected thereto. The chamber 36 is connected through a high-pressure line 38 to a duplex control valve 39.

The valve 39 comprises two substantially identical, independently-operable valves 39a and 39b. The valve section 39a has two fluid lines 40 and 41 connected thereto and connected to operate a hydraulic motor 44, carried by the pontoon 11, and operating a propeller 46. The valve section 39b also has two fluid lines 42 and 43 connected thereto and connected to operate a hydraulic motor 45, carried by the pontoon 12, and operating a propeller 47. Each of the valve sections 39a and 39b is also connected to a return line 48 leading to a hydraulic fluid reservoir 50, serving to store the hydraulic fluid, which may be of any suitable non-flammable, non-corrosive type. A fluid line 49 connects the reservoir 50 to the main pump 33. An air vent line 50a is also provided, leading from the hydraulic fluid reservoir 50 to a point on the boat unit 10 which is higher than any other point of the fluid system.

Each of the valve sections 39a and 39b is also provided with a handle 51a and 51b having three possible positions. The operation of the valve sections 39a and 39b is identical, and the operation of one only will therefore be described. Such valves are commonly employed in hydraulic power systems, a typical example being a control valve model VIDD 34 C manufactured by the Ware Machine Works, Ware, Massachusetts.

When the handle 51a is placed in a first position, the pressure line 38 is connected to line 40, and the return line 48 is connected to the line 41. This causes operation of the hydraulic motor 44 in a first direction of rotation, operating the propeller 46 in a first direction, to cause forward propulsion.

When the handle 51a is placed in a second or opposite position, the pressure line 38 is connected to the line 41, and the return line 48 is connected to the line 40, causing operation of the hydraulic motor in a second direction of rotation, operating the propeller 46 in a second direction, to cause rearward propulsion. The handle 51a also has a third or intermediate position in which the pressure line 38 is shut off from communication with either of the lines 40 and 41, and the motor 44 is therefore not operated. The handle 51b of the valve section 39b operates in a similar manner but independently of the valve-section 39a to cause rotation, counter-rotation, or stopping of the motor 45 and the propeller 47.

In addition to the three positions of the handles 51a and 51b referred to, each handle may be independently operated at intermediate settings in which the ports to the lines 40, 41, and 42, 43, are partially opened in varying degrees, thereby restricting the flow of fluid therethrough, and varying the speed of operation of the hydraulic motors 44 and 45, all with essentially little or no change in the pressure in the line 38. When, such as in unusual circumstances, a speed is desired which is higher than that obtained with the handles 51a and 51b in their fully-open position, the pressure may be increased in the line 38, in a manner to be described.

Figure 7:
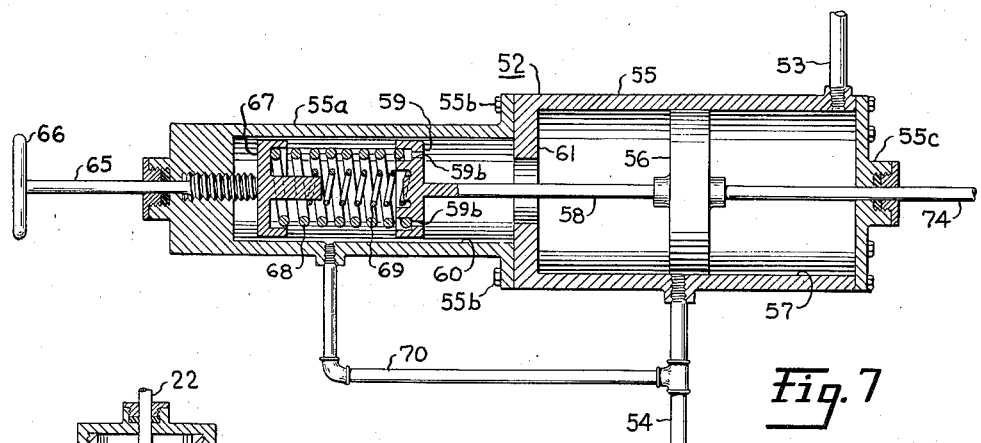
FIGURE 7 is a sectional view of a control assembly.

Adjustment and control of the pressure system in the operating condition is primarily achieved by pressure control assembly 52, connected between the high pressure line 38 and the return line 48 by means of lines 53 and 54 respectively. Referring particularly to FIGURE 7, the control assembly 52 comprises a generally cylindrical body 55, having a substantially fluid-tight piston 56 slidably supported in a main chamber 57 therein. The piston 56 is connected by a rod 58 to a cup-shaped member 59, slidably supported in a chamber 60 in the cylindrical portion 55a which is attached to the body 55 by bolts 55b. A peripheral shoulder 61 is provided between chambers 60 and 57 to provide a stop for the travel of the member 59 in the right-hand direction as viewed, and also to provide a stop for the travel of the piston 56 in a left-hand direction as viewed.

The body 55a has an axial opening which is tapped to receive an adjustable shaft 65 having an external handle 66 and carrying a cup-shaped stop member 67. A pair of coaxially disposed compression springs 68 and 69 are supported between the cup-shaped members 59 and 67, being held in recesses in the member 59. The member 59 also has openings 59b to equalize the pressure on either side thereof, and a line 70 connects the chamber 60 to a return line 54 leading from the main chamber 57 to the main return line 48, for the purpose of allowing any fluid which may leak past the piston 56 to be returned to the return line.

The piston 56 is connected by a second rod 74, extending through a fluid-tight opening in the end wall 55c of the cylinder 55, to a speed control member or throttle of the engine 31.

In operation, if a particular pressure is desired, the handle 66 of the control 52 is turned inwardly, forcing the stop member 67, springs 68 and 69, and the piston 56, together with rod 74, to the right as viewed. This causes acceleration of the motor 31, and increase of pressure in line 38, which in turn increases speed of operation of the hydraulic motors 44 and 45. As the pressure in line 38 increases, the pressure in chamber 57 also increases, forcing the piston 56 to the left and moving the rod 74 to the left to decrease the speed of the motor 31. The piston 56 will therefore position itself at an intermediate position in which the pressure required to maintain it in such position against the bias of the spring 68 or both springs 68 and 69, is just provided by motor 31 operating at the speed determined by the then existing setting of the throttle as set by the piston.

It will be observed that as the initial length or force of the spring 68 is varied, the pressure required to move the piston to the left is also varied. It will also be observed that the speed of the engine necessary to maintain the desired pressure is automatically provided.

In all normal operating positions of the piston 56, whether to the extreme right so as to be accelerating the engine, or to the left so as to decelerate the engine, the piston 56 will ordinarily be to the right of the port leading to the outlet 54. At certain times however, such as when the control 39 is operated so as to shut off both hydraulic motors while the engine 31 is still operating, the pressure in line 38 may tend to become excessive, due to the inertia of the engine, etc. In such cases, the piston 56 is forced farther to the left by such excessive pressure, and uncovers the port to the outlet 54, allowing the pressure to be relieved to a safe lower level through the line 54 and 48, thus providing a safety-valve action.

It will therefore be seen that the control 52 performs three important functions: (1) it provides a means for manually setting the desired pressure and for automatically maintaining such pressure, (2) it adjusts the speed of the engine 31 automatically to maintain the desired pressure, and (3) it provides a safety-valve action.

The spring 69 is provided within the spring 68, and of lesser length than spring 68 in order to provide a high gradient of force adjustment. In addition, the spring 69 serves to maintain usable control in the event that spring 68 should break.

A suitable pressure gage 75 is also provided, connected to the pressure line 38 to provide an indication of the pressure therein.

If automatic pressure control is not desired, the control 52 may be omitted entirely, and a simple safety valve substituted therefor, suitably connected, as between pressure line 38 and return line 48. In this event, the rod 74 would be replaced by a conventional manually operable throttle member.

In accordance with the invention, supplementary motive power and stabilizing means is also provided comprising the four pumps 24, 25, 29, and 30, described above, deriving their energy from the action of the waves. Each of the pumps 24, 25, 29, and 30, is provided with an outlet line 24', 25', 29', and 30', respectively, which has one branch thereof connected directly to a line 76', 77', 78', and 79', respectively, extending between valves 76a—76b, 77a—77b. 78a—78b, 79a—79b, respectively. The valves 76a, 77a, 78a, and 79a are one-way valves which permit flow of fluid into pressure chamber 36, but not out of it. The valves 76b, 77b, 78b, and 79b, are one-way valves which permit fluid flow out of reservoir 50, but not into it.

Figures 8, 9:
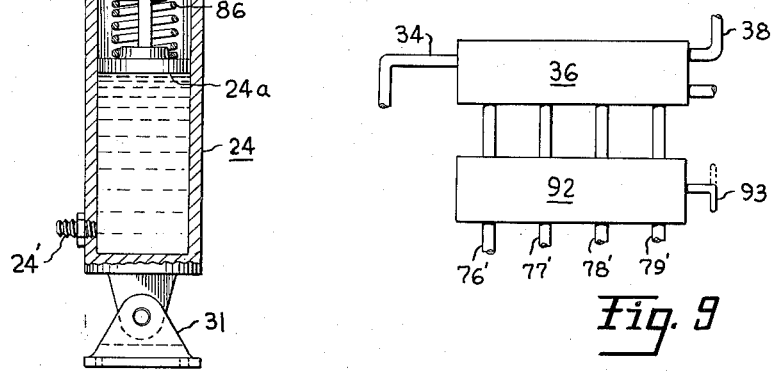
FIGURE 8 is a sectional view of one of the pontoon cylinder assemblies.
FIGURE 9 is a schematic representation of a modified valve assembly for use with the invention.

Each of the pumps 24, 25, 29, and 30, is of the reciprocating piston type, comprising a cylinder and a piston, 24a, 25a, 29a, and 30a, and each has only one line 24', 25', 29', and 30', respectively, connected thereto, see FIGURE 8. The pressure in each of said lines therefore alternates from positive to negative pressure as the pistons 24a, 25a, 29a, and 30a thereof are reciprocated by the action of the waves.

If it be assumed for the moment that the pressure in the chamber 36 is relatively low, due to relatively low pressure in the air head chamber 37, because of nonfunctioning or mal-functioning of the motor 31 or other reason, then the development of a relatively higher pressure in the lines 24', 25', 29', and 30', will cause flow of fluid therefrom into the chamber 36 through the corresponding valve 76a, 77a, 78a, or 79a. Likewise, when the the pressure in the lines 24', 25', 29', 30', becomes negative, as on an upstroke of the piston in each pump, fluid will be drawn into the lines from the reservoir 50 through the corresponding valves 76b, 77b, 78b, 79b. The result, therefore, of the reciprocating action of each of the pumps 24, 25, 29, and 30, is to transfer fluid from the reservoir 50 into the chamber 36 in the same manner as the main pump 33. From the chamber 36, the fluid flows through the line 38, main control valve 39, to drive the hydraulic motors 44 and 45 and the propellers 46 and 47 in a similar manner as previously described.

Thus in case of emergency, such as failure of the main power unit 31 or lack of fuel, a supplementary propulsion system is provided by the pontoons, deriving their energy from the action of the waves.

When the motor or engine 31 is in proper operating condition and is sufficient to develop high pressure in chamber 36, such pressure will ordinarily be higher than that developed in the lines 24', 25', 29', and 30', even on the downstroke of the respective pistons 24a, 25a, 29a, and 30a. No fluid will, therefore, flow from such lines into the chamber 36 at such time. On the succeeding upstroke of the pumps, however, additional fluid will be drawn into the lines from the reservoir 50. This action will continue until the cylinders of the pumps 24, 25, 29, and 30 are substantially filled with fluid, with the pistons at the top of their stroke. When this condition exists, the connecting rods 22, 23, 27, and 28, will, in effect, be locked in their uppermost position, and the pontoons 11 and 12 in their relatively lowermost position, with the boat unit 10 supported almost entirely out of the water, by the pontoons, as shown in FIGURE 4.

In ordinary running condiion, therefore, the boat unit 10 operates in a planing or water-skimming condition, its weight being supported substantially entirely by the pontoons 11 and 12. This is a very important feature, since the boat thus operates in an extremely efficient, stable and comfortable manner, even at high speeds.

When the pistons of the pumps 24, 25, 29, and 30 are held in their uppermost position such as when they are unable to develop pressure higher than that existing in chamber 36, nevertheless a small amount of resilient motion is provided whenever a force, such as the impact of a wave, is exerted on a pontoon so as to cause it to develop a transient high pressure. This is because the valves 76a, 77a, 78a, and 79a in effect connect the lines 24', 25', 29', and 30' to the air head tank 37 through the chamber 36. The air head tank 37 at such times acts as a cushioning device to reduce the effect of such high impact forces on the pontoons.

In order to permit operation of the boat unit 10 in a planing condition when desired, without the necessity of waiting for the pumps 24, 25, 29, and 30 to develop a high pressure by wave action, and even if the boat is standing at a dock, means is provided for connecting the high pressure line from the chamber 36 directly to the pump cylinders 24, 25, 29, and 30. For this purpose, a second branch, 80, 81, 82, and 83, is provided for each of the lines 24', 25', 29', and 30', respectively, each being connected through a compound valve 84 and a branch line 85, to the high pressure line 38 of chamber 36. When the valve 84 is in closed condition, each of the lines 80, 81, 82, and 83 is shut off from the line 85, and operation of the apparatus is as described above. When it is desired to lower the pontoons 11 and 12 by means of the power generated by the motor 31, the valve 84 is opened, and the pressure in chambers 36 and 37 is transmitted to the cylinders 24, 25, 29 and 30, forcing the respective pistons to their uppermost position.

For the purpose of cushioning the end of the upstroke of the pistons 24a, 25a, 29a and 30a, a compression spring 86 is also provided within each of the cylinders. Thus the motion of the pontoons 11 and 12 in both upward and downward directions is resiliently resisted or cushioned, the downward travel being cushioned by the resilience of the air in air head 37, as described above, and the upward travel by the springs 86. Moreover, when the valve 84 is open, the air head chamber 37 acts as a cushion for the travel of the pistons 24a, 25a, 29a, and 30a in both directions.

If it is not desired to operated the boat in a planing condition when the motor is in operation, the pressure control 52 may be set to maintain a pressure in chamber 36 which is relatively low, and the pumping action of the pontoons utilized to partially supply the propelling force.

For the purpose of making it possible to start the motor or engine 31 easily without the opposition of the inertia of the fluid in the various lines and of the hydraulic motors 44 and 45, and the propellers 46 and 47, a starting valve 90 is provided, connected by lines 91 and 91' between the outlet and inlet ports of the pump 33.

When the valve 90 is open, the pump 33 is, in effect short-circuited through the lines 91 and 91' and the valve 90, providing a no-load condition, in which the motor 31 may easily be started. The one-way valve 34' at such time prevents the flow of fluid backward from the chamber 36.

In FIGURE 9, there is shown an alternate structure for causing the pontoons 11 and 12 to be lowered by the force of the motor 31. According to this embodiment, the branch lines 80, 81, 82, and 83, the valve 84, and the line 85 are all omitted, and the valves 76a, 77a, 78a, and 79a are replaced by a single compound valve 92, having a manually operable member 93. The construction of the valve 92 is such that with the handle 93 in a first position, a one-way valve connection is provided between each of the incoming lines 76', 77', 78', and 79', and the chamber 36. The operation in this condition is the same as with the individual one-way valves 76a, 77a, 78a, and 79a, described above.

When the handle 93 is moved to another position, however, the lines 76', 77', 78', and 79', are directly connected, without valve action, to the chamber 36, permitting two-way flow therethrough. In this condition, therefore, the pressure from chamber 36 is transmitted back to the cylinders 24, 25, 29, and 30, forcing the pistons thereof to their uppermost position and against their respective springs, and forcing the pontoons 11 and 12 to their lowermost position, raising the boat unit 10.

The pontoons 11 and 12 are preferably made of such size that either one has sufficient buoyancy to support the weight of the boat unit 10, and for two important reasons. First, the pontoons have such buoyancy in order to obtain the maximum work from such pontoons as well as the maximum stabilizing action. The energy made available by the action of the waves is practically unlimited. To obtain the maximum work therefrom with a boat unit of given size and weight, however, it is necessary that each pontoon separately be able to displace a weight of water equal to that displaced by the boat unit. Thus the force of a wave tending to raise a pontoon with respect to the boat unit can be as great as that required to lift the boat unit out of the water. Any lesser size or buoyancy of pontoon would mean that available energy was not being used. Any greater size of buoyancy would produce no greater work and would be a waste of material and would add unnecessarily to the cost, weight, and drag of the craft.

Secondly, for maximum safety, the weight of the craft may be supported in the water by a single pontoon so that even if the other were wholly destroyed and the boat flooded, it would still stay afloat.

Figure 1:
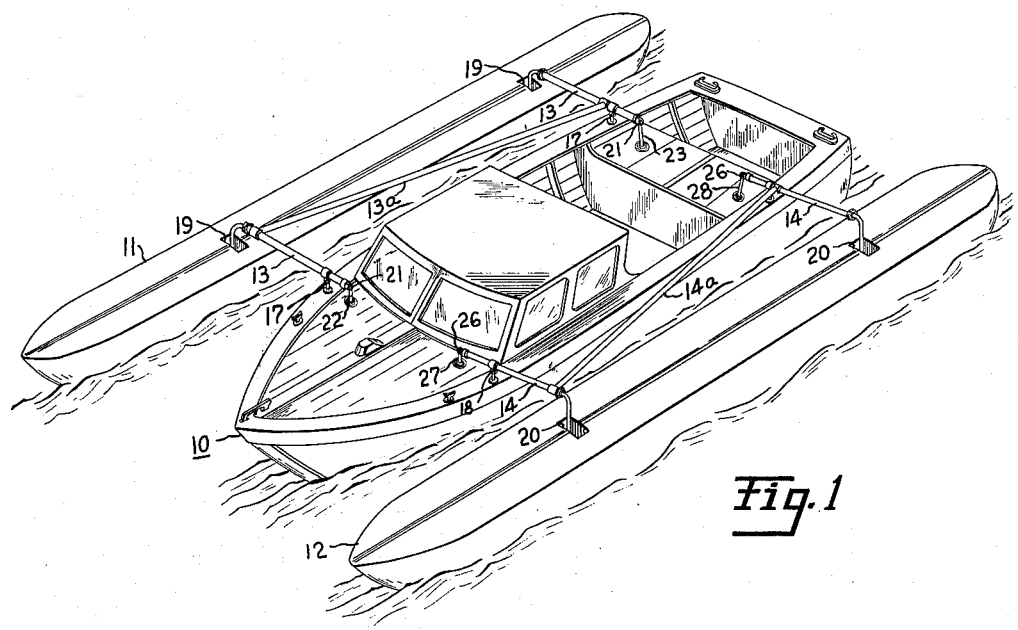
FIGURE 1 is a perspective view of a boat incorporating the invention.
Figure 2:
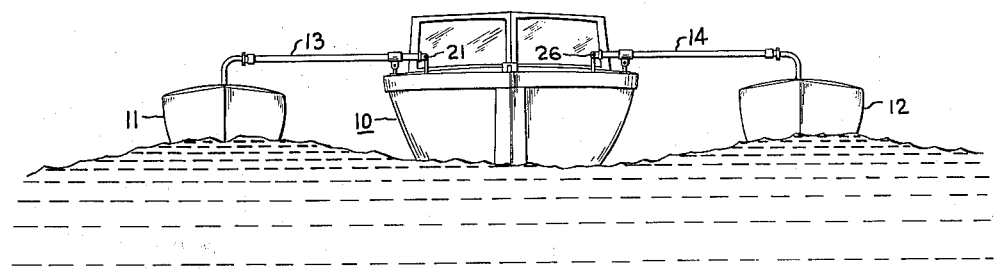
FIGURE 2 is a front elevation view of the boat of FIGURE 1.
Figure 10:
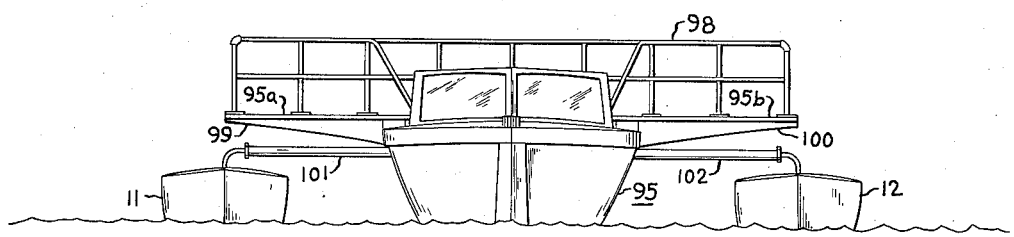
FIGURE 10 is a front elevation view of a modified form of the invention.

The embodiment of the invention illustrated in FIGURE 10 is, in general, similar to the embodiment of FIGURE 1 excepting that the decks of the main boat unit 95 are extended at each side 95a and 95b over the space between the boat unit and the pontoons 11 and 12. A suitable railing 98 is also provided around such extended decks. The supporting structure 99 and 100 for the extended decks 95a and 95b is angled upwardly away from the hull of the boat unit 95 to provide clearance for the connecting arms 101 and 102, which enter through suitable openings in the side of the hull.

This form of the invention is especially suited for use with boats of medium or susbtantial size, and provides a boat having a substantial deck area but of relatively shallow draft, while providing a high degree of stability, and at relatively lower cost together with the advantages set forth above in connection with the form illustrated in FIGURE 1–9.

While the invention has been illustrated only in particular embodiments, it will be readily appreciated that many modifications thereof may readily be made by those skilled in the art, and I therefore intended by the appended claim to cover all such modifications as fall within the true spirit and scope of the invention.

I claim:

A boat comprising a main boat unit, a pair of pontoons one of which is positioned at each side of the main boat unit, arms for joining said pontoons to the main boat unit, said arms being pivotally secured intermediate their ends to the main boat unit and pivotally connected at one end to the pontoons, and a hydraulic fluid system comprising a reservoir for holding a supply of hydraulic fluid, a hydraulic cylinder and piston for each arm, each of said pistons being connected to an arm, means for storing hydraulic fluid under pressure, valve and conduit means for conveying hydraulic fluid under pressure to said cylinders to actuate the pistons and arms to position the main boat unit relative to said pontoons, and additional valve and conduit means for conveying fluid from said reservoir to the hydraulic cylinder and thence to said storing means under the pumping action of the piston and arm in response to wave action on said pontoons.

References Cited in the file of this patent

UNITED STATES PATENTS

| | | |
|---|---|---|
| 849,006 | Mikorey | Apr. 2, 1907 |
| 1,062,832 | Kurrel et al. | May 27, 1913 |
| 1,172,737 | Roach | Feb. 22, 1916 |
| 1,321,304 | Hamilton | Nov. 11, 1919 |
| 1,683,276 | Woods | Sept. 4, 1928 |
| 1,710,625 | Kapigian | Apr. 23, 1929 |
| 1,827,438 | Rauch | Oct. 13, 1931 |
| 2,066,101 | Dunlap et al. | Dec. 29, 1936 |
| 2,271,065 | Dornier | Jan. 27, 1942 |
| 2,310,361 | Ford | Feb. 9, 1943 |
| 2,347,959 | Moore et al. | May 2, 1944 |
| 2,486,049 | Miller | Oct. 25, 1949 |
| 2,520,804 | Hollar | Aug. 29, 1950 |
| 2,585,599 | Tchetchet | Feb. 12, 1952 |
| 2,596,194 | Anderson | May 13, 1952 |
| 2,738,849 | Nubling | Mar. 20, 1956 |
| 2,850,747 | Bouchard | Sept. 9, 1958 |
| 2,887,979 | Bader | May 26, 1959 |
| 2,916,880 | Hann | Dec. 15, 1959 |